United States Patent [19]
Snyder

[11] 4,256,806
[45] Mar. 17, 1981

[54] SMUDGE FREE GRAPHITE COATED POLYMERIC SUBSTRATE AND A METHOD FOR PREPARING THE SAME

[75] Inventor: Ritchie A. Snyder, Elkton, Md.

[73] Assignee: W. L. Gore & Associates, Inc., Newark, Del.

[21] Appl. No.: 54,679

[22] Filed: Jul. 5, 1979

[51] Int. Cl.³ .................... D02G 3/00; B05D 1/00; B05D 3/00; B05D 3/12
[52] U.S. Cl. ................................ 428/378; 428/421; 260/29.1 SB; 427/355; 427/371; 427/401
[58] Field of Search .............. 260/29.1 SB, 42.26, 260/42.49; 427/355, 401, 371; 428/474, 421, 422, 516, 447, 451, 517, 378

[56] References Cited

U.S. PATENT DOCUMENTS

| | | | |
|---|---|---|---|
| 3,923,697 | 12/1975 | Ellis | 260/42.49 X |
| 3,928,703 | 12/1975 | Cook | 428/422 X |
| 3,953,566 | 4/1976 | Gore | 264/288 |
| 3,962,153 | 6/1976 | Gore | 264/127 X |
| 4,157,328 | 6/1979 | Beyer et al. | 260/29.1 SB |

*Primary Examiner*—Michael R. Lusignan
*Attorney, Agent, or Firm*—John S. Campbell

[57] ABSTRACT

A three component mixture of graphite, a liquid and a PTFE fine powder dispersion which has a homogeneous appearance and can be applied onto a substrate to provide a clean, glazed coating that does not easily shed graphite. Suitable substrates include: polytetrafluoroethylene filament; PTFE membrane; PTFE filament filled with graphite; polypropylene thread; polyaramide fibers.

16 Claims, 1 Drawing Figure

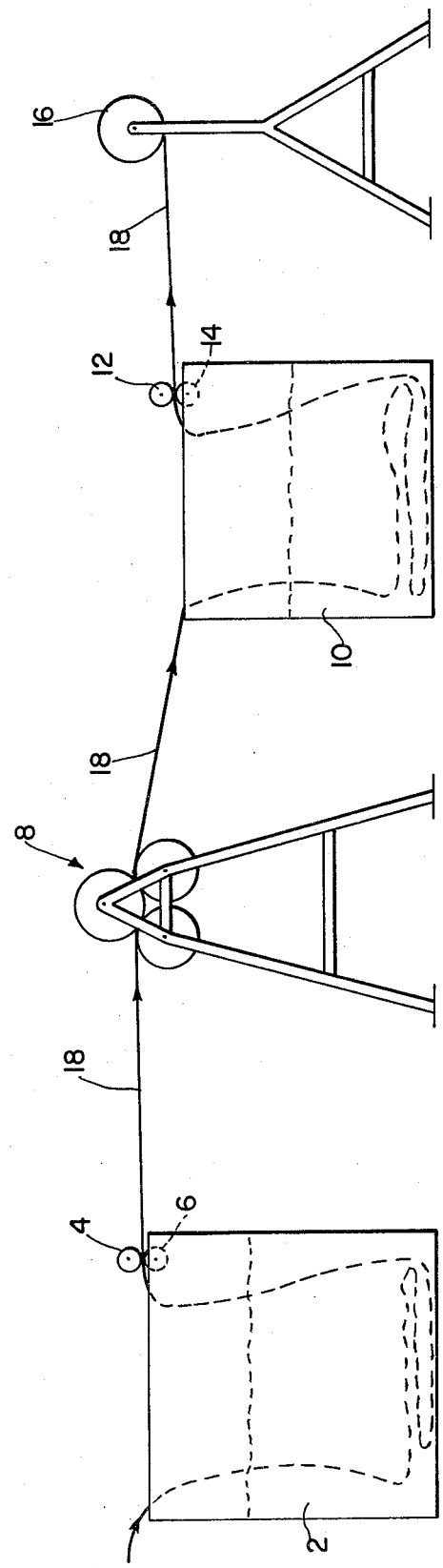

SMUDGE FREE GRAPHITE COATED POLYMERIC SUBSTRATE AND A METHOD FOR PREPARING THE SAME

FIELD OF THE INVENTION

This invention relates to an improved graphite coated substrate.

BACKGROUND OF THE INVENTION

In many applications it is desirable to have graphite impregnated in or coated on a polymeric substrate. The graphite supplies lubricity and conductivity to the composite. Packings and seals are an area where the composite of graphite and a polymer is particularly advantageous.

A packing is a sealing member which is used to prevent or minimize leakage between two components of a fluid container or a pump, which components may undergo relative motion. The packing should fit correctly in the packing space, be able to withstand the temperature and pressure conditions, be negligibly affected by the fluid being sealed and be sufficiently flexible to accommodate the varying degrees of longitudinal and/or radial displacement.

Where there is relatively no motion, slow or infrequent motion, such as in valves, packings can seal without leakage. When rapid motion occurs, either reciprocating or rotating, such as in centrifugal pumps, packings must permit the escape of continuous small amounts of liquid past the seal. Continuous, effective operation is dependent on the maintenance of wetted surfaces to minimize heat build up.

A common type of shaft seal consists of a packing composed of fibers or filaments which are first woven, twisted or braided into strands and then formed into coils, spirals or rings for insertion around the shaft.

Many packings have an impregnant built into them which, among other things, acts as a primary lubricant for the start up and break-in adjustment. During this period, a certain amount of the primary lubricant is lost. A large portion of the present braided packings tend to leak excessively. This results in the primary lubricant bleeding out, causing friction with the attendant generation of heat, which is the primary cause of packing failure.

The break-in period of the packings requires careful adjustment of the compression force against the packing and several such adjustments may be required. Otherwise, the packings either leak excessively or, when too much compression is used, overheat and score the rotating shafts of the seal so they must be replaced.

Because of its chemical and biological inertness and its lubricity, polytetrafluoroethylene (PTFE) has found wide application as a packing material in the chemical, food and drug industry.

A disadvantage of the use of PTFE as a pump packing is that it is a good insulator and does not conduct away the heat generated during operation as rapidly as some other packings. An attempt was made to overcome this problem by impregnating the PTFE with a good heat conductive material which is also a lubricant. The most frequently used impregnant for this purpose is graphite. While graphite impregnation results in improved heat transfer, problems have arisen in that some particles of impregnant graphite break free from the host PTFE packing and contaminate the fluid being transported. These graphite impregnated packings also suffer from the drawback that they are messy and dirty to handle.

In the early 1970's a new form of PTFE became available. This form of PTFE was unique in that it combined high porosity with high strength. The process for manufacturing this unique product is described in U.S. Pat. No. 3,953,566. A continuation-in-part, U.S. Pat. No. 3,962,153 discloses very high strength porous filaments which are particularly useful for braiding, weaving or twisting into packing. The products of U.S. Pat. No. 3,962,153 can be impregnated with graphite and overcome a degree of the problems outlined above. They do not offer a completely satisfactory solution, however.

SUMMARY OF THE INVENTION

A mixture is formed by the mixing of graphite, a PTFE dispersion and a liquid lubricant having sufficient fluidity to permit the shearing of the PTFE dispersion. The following ratios of components have been proved satisfactory: 15–45 parts graphite; 15–60 parts liquid lubricant and 25–80 parts PTFE dispersion which is 60% solids. A fiber or filament substrate can be coated with this mixture and a shearing force applied to the coating to produce a coated substrate which does not shed graphite, e.g., in handling or use. In the terminology of this application, such a coated substrate is referred to as smudge-free. In a preferred embodiment, an expanded PTFE filament or an expanded PTFE filament which filled with graphite, is used as the substrate.

A smudge-free substrate is thus provided which is clean, i.e., the graphite will not readily wipe off to contaminate materials.

BRIEF DESCRIPTION OF THE DRAWINGS

The FIGURE is a sketch of a continuous process for producing the product of this invention.

DETAILED DESCRIPTION OF THE INVENTION

A key concept of this invention is that the coating of a polymeric filament or fiber with a three component mixture provides a novel product. This product, surprisingly, cannot be achieved when the components are coated onto the filament sequentially but separately.

The three components contemplated by this invention are a PTFE fine powder dispersion, a graphite powder and a liquid lubricant. These components can be admixed to give a mixture that appears homogeneous.

PTFE fine powder dispersions are obtained by polymerization of tetrafluoroethylene in liquid water containing a suitable dispersing agent. These dispersions can then be concentrated. The preferred dispersion used in this invention has been concentrated to about 60% by weight solids. Such a product is available from I.C.I. America under the trade designation FLUON AD-1.

The graphite is in finely divided powder form. Preferably, the graphite has a particle size of which 97% minimum passes through a minus 325 mesh. A presently preferred graphite powder is available from Ashbury Mills as Grade A-99.

The liquid lubricant is required to have sufficient fluidity to permit the PTFE dispersion to be sheared. The lubricant must have a kinematic viscosity of about 60,000 centistokes or less. The examples indicate a wide range of liquid lubricants which will achieve the purposes of this invention. A presently preferred liquid is a silicone such as polydimethyl siloxane sold by Dow Corning as DOW CORNING 200. This silicone oil (DOW CORNING 200) covers a variety of different viscosity oils. Other solvents found suitable are the ISOPAR series sold by Exxon.

The three components are mixed together. Initially, the graphite and silicone oil do not mix well. After sufficient agitation, the mixture forms a very black fluid which has the appearance of being homogeneous. When a filament is passed through the mixture, it is coated by it. When the coated filament is rubbed between one's fingers, or drawn across a series of fixed rods, the PTFE dispersion particles are sheared to form fine fibrils which entrap the graphite and bond the PTFE-silicone-graphite mixture firmly to the filament. The water introduced as part of the PTFE fine powder dispersion is either expelled during the shearing action or subsequently removed by drying. In contrast, when the filament was treated sequentially with a silicone oil and graphite mixture, the filament smudged heavily upon handling, even after removal from the mixture for over an hour. It is thought that the lubricant, in the case described, is required for lubricating the PTFE, thereby entrapping the graphite powder so that a coated filament that is not susceptible to flaking or break-off of its components and is clean and easy to handle is produced. However, it is not my intent to limit the invention to this or any other theory.

Although the preferred polymeric substrate material utilized in this invention is expanded PTFE fibers sold under the trademark GORE-TEX by W. L. Gore & Associates, Inc., the inventive suspension can be used with other substrates such as PTFE fibers, polyester fibers, polypropylene fibers, fiberglass and asbestos fibers. The invention is not limited to coating of fibers. The novel coating composition can be applied to other substrates such as films, rods and tubes.

The following examples are intended to illustrate but not limit the present invention.

EXAMPLE I 15.5 gms. of 1000 centistokes viscosity silicone oil sold by Dow Corning under the trade designation DOW CORNING 200, 11 gms. of graphite powder sold under the trade designation A-99 by Asbury Mills, and 40 milliliters of PTFE dispersion sold under the trademark AD-1 by Imperial Chemical Industries, were vigorously mixed by hand until a very black, low viscosity liquid-like suspension was produced. An expanded PTFE/graphite fiber with a density of approximately 0.8–1.2 and a tenacity of 0.7–1.2 was dipped into this mixture and the mixture rubbed onto the fiber by the thumb and forefinger until a sheared, glazed coating was created on the fiber. A clean, smudge-free fiber with encapsulated graphite, PTFE and silicone oil was obtained.

EXAMPLE II 20 milliliters of FLUON AD-1 dispersion (this represents 17.9 grams of PTFE), 11 grams of graphite and 15.5 grams of silicone oil (DOW CORNING 200; 1000 centistokes) were admixed by stirring with a wooden spatula. This mixture on a weight by weight basis is 25 parts graphite, 35 parts silicone oil and 67 parts PTFE dispersion. The result is a very thin mixture in which the graphite appears to be uniformly dispersed.

Approximately one foot samples of the following were dipped in the above mixture:

(a) A 9600 denier, 50% graphite filled GORE-TEX filament sold under the trade designation Y096G4 by W. L. Gore & Associates, Inc.

(b) A 9600 denier 100% pure PTFE GORE-TEX filament sold under the trade designation Y096T4 by W. L. Gore & Associates, Inc.

(c) A 9600 denier 100% PTFE GORE-TEX filament sold under the trade designation Y096T0 by W. L. Gore & Associates, Inc.

Each sample was immersed in the liquid until it appeared to be totally covered. The sample was then removed and the coating sheared by passing the coated filament, under light pressure between the thumb and forefinger. The process was repeated. The double dipped, double sheared filaments were then allowed to air dry for 24 hours.

The samples were inspected and found to be evenly coated and smudge-free.

EXAMPLE III

Another mixture was prepared as in Example I. The components were present in the following amounts: 11 grams graphite A-99; 31 grams silicone oil (DOW CORNING 200; 1000 centistokes); and 20 milliliters FLUON AD-1. This mixture on a weight by weight basis is 18 parts graphite, 52 parts silicone oil and 50 parts PTFE dispersion. The three filaments were again double dipped, double sheared and air dried for 24 hours. The samples were smudge free and had an even coating.

EXAMPLE IV

A mixture as in Example I was prepared with the components present in the following amounts: 11 grams graphite A-99; 31 grams silicone oil (DOW CORNING 200; 1000 centistokes); and 10 milliliters of FLUON AD-1 dispersion. This mixture on a weight by weight basis is 22 parts graphite; 61 parts silicone oil and 30 parts PTFE dispersion. With this ratio of components, the resultant mixture was very thick and had almost a paste-like consistency. The three samples were coated as described in Example I. The coating was even and smudge free. These samples were oilier in appearance than the other three.

EXAMPLE V

The mixture of Example I was prepared with the components present in the following amounts: 11 grams of graphite A-99; 15.5 grams silicone oil (DOW CORNING 200; 1000 centistokes) and 40 milliliters of FLUON AD-1 dispersion. This mixture on a weight by weight basis is 18 parts graphite, 25 parts silicone oil and 95 parts PTFE dispersion. A one foot sample of Y096G4 was coated with this mixture as described in Example I. After air drying for 24 hours the sample was evenly coated and smudge free.

EXAMPLE VI

A mixture was prepared as described in Example I. The components were present in the following amounts: 11 grams graphite A-99; 15.5 grams silicone oil (DOW CORNING 200; 1000 centistokes); and 5 milliliters of FLUON AD-1 dispersion. This mixture on a weight by weight basis is 35 parts graphite, 50 parts silicone oil and 25 parts PTFE dispersion. This mixture resulted in a very thick paste. A sample of Y096G4 was successfully coated as described in Example I and an even smudge free coating was observed.

EXAMPLE VII

A mixture was prepared as described in Example I. The components were present in the following amounts: 11 grams of graphite A-99; 5 grams of silicone oil (DOW CORNING 200; 1000 centistokes) and 10 milliliters of FLUON AD-1 dispersion. This mixture on a weight by weight basis is 44 parts graphite, 20 parts silicone oil and 60 parts PTFE dispersion. The mixture was again a thick paste as in Example VI. A smudge free even coating was produced on a sample of Y096G4 by the method of Example I.

EXAMPLE VIII

A mixture was prepared as described in Example I. The components present were 11 grams of graphite, 10 milliliters of a hydrocarbon solvent sold under the trade designation ISOPAR "K" by the Exxon Corporation, and 10 milliliters of FLUON AD-1 dispersion. This mixture on a weight by weight basis is 40 parts graphite, 28 parts hydrocarbon oil and 53 parts PTFE dispersion. A liquid mixture was produced and a sample of Y096G4 was treated to give a smudge free even coat by the procedure described in Example I.

EXAMPLE IX 1.25 kilograms of graphite A-99, 1.86 kilograms of silicone oil (DOW CORNING 200) and 1.25 kilograms of FLUON AD-1 dispersion were mixed using a hand held food mixer to produce a liquid mixture in which the graphite appeared to be evenly dispersed. This mixture on a weight by weight basis is 28 parts graphite, 43 parts silicone oil and 48 parts PTFE dispersion. The samples of the following were then treated with this mixture as described in Example I:

(a) A polyaramide fiber available from E. I. duPont de Nemours & Co., Inc., under the trade designation KELVAR.

(b) A polyamide fiber available from E. I. duPont de Nemours & Co., Inc., under the trade designation NOMEX.

(c) A polypropylene sewing thread available from The Bemis Company, Inc.

(d) A combination asbestos/PTFE fiber available from The Raybestos Company.

(e) An expanded PTFE sheet available from W. L. Gore & Associates, Inc., under the trade designation GORE-TEX.

In all cases a smudge free even coating was produced on the substrates.

EXAMPLE X

A mixture was attempted to be prepared as described in Example I. The components present were 11 grams of graphite A-99; 15.5 grams of silicone oil with the viscosity of 40,000 centistokes also sold under the trade designation DOW CORNING 200 and 40 milliliters of FLUON AD-1. A mixture was produced and a sample of Y096G4 was treated to give a smudge free even coating by the procedure described in Example I.

COMPARATIVE EXAMPLE I

A two-component mixture was prepared by mixing 11 grams of graphite A-99 and 20 milliliters of FLUON AD-1 dispersion. The mixture was hand stirred to give a very thin liquid in which the graphite appeared to be uniformly dispersed. The three samples of Example I were treated with this mixture as described in Example I. After air drying for 24 hours, the samples and an uneven coating and the graphite smudged.

COMPARATIVE EXAMPLE II

A two-component mixture was prepared as in Comparative Example I. The components were present in the following amounts: 11 grams A-99 graphite and 40 milliliters FLUON AD-1 dispersion. Again, the three samples were coated as described in Example I. The coating was uneven and smudged.

COMPARATIVE EXAMPLE III

A two-component mixture was prepared as in Comparative Example I. The components were present in the following amounts: 22 grams A-99 graphite and 10 milliliters FLUON AD-1 dispersion. The result of this was a crumbly mixture unsuitable for coating.

COMPARATIVE EXAMPLE IV

A mixture was attempted to be prepared as described in Example I. The components present were 11 grams of graphite A-99; 15.5 grams of silicone oil with the viscosity of 60,000 centistokes (DOW CORNING 200), and 40 milliliters of FLUON AD-1 dispersion. This time, however, a usable mixture was not achieved.

CONTINUOUS PROCESS

FIG. 1 shows apparatus used in producing continuous lengths of the product of this invention. The substrate to be coated 18 was fed into a container containing the three-part mixture 2 as prepared in Example I. As the substrate 18 exits from the container, it passes between two shearing rolls 4 and 6. 6 is a rubber roll; 4 is a steel roll.

The substrate is then fed into a container of silicone oil (DOW CORNING 200) 10 and on exiting passes between two rubber pinch rolls 12 and 14. Finally, the substrate is wound onto a take-up 16. 8 is a motorized pull through which, along with the take-up 16, pulls the substrate through the process. The reason for the passes through the silicone oil bath in the continuous process is that many packings and packing fibers are bathed in oil as a routine measure to help break-in procedures at start-up.

All parts and percentages referred to in the specification and claims are by weight unless otherwise specified. Also all parts and percentages with respect to the PTFE dispersion refer to the total weight including water of dispersion which contains 60% solids.

I claim:

1. A method for coating a polymeric substrate with a smudge free graphite coating comprising:
    (a) Dipping said polymeric substrate in a mixture which has a homogeneous appearance comprising:
        (1) 15–45 parts graphite;
        (2) 15–60 parts liquid lubricant; and
        (3) 25–80 parts polytetrafluoroethylene fine powder dispersion containing approximately 60% solids.
    (b) Applying a shearing force to the coating on said coated substrate; and
    (c) Drying said sheared coated substrate.

2. The method of claim 1 in which said liquid lubricant is silicone oil.

3. The method of claim 1 in which said liquid lubricant is a hydrocarbon solvent.

4. The method of claim 1 in which said coating step is performed by dipping said substrate in said coating composition.

5. A coated polymeric substrate including a substrate and a smudge free, even coating of a composition comprising:
 (a) 15-45 parts graphite;
 (b) 15-60 parts liquid lubricant; and
 (c) 25-80 parts polytetrafluoroethylene fine powder dispersion containing approximately 60% solids.

6. The coated polymeric substrate of claim 5 in which the liquid lubricant is silicone oil.

7. The coated polymeric substrate of claim 5 in which the liquid lubricant is a hydrocarbon solvent.

8. The coated polymeric substrate of claim 5 in which the substrate is polytetrafluoroethylene.

9. The coated polymeric substrate of claim 5 in which the substrate is expanded polytetrafluoroethylene.

10. The coated polymeric substrate of claim 5 in which the substrate is polypropylene.

11. The coated polymeric substrate of claim 5 in which the substrate is polyamide.

12. The coated polymeric substrate of claim 5 in which the substrate is polyarimide.

13. A process for manufacturing a packing material comprising:
 (a) coating a plurality of polymeric substrates with a smudge-free, even coating of composition of (i) 14-45 parts graphite; (ii) 15-60 parts liquid lubricant; and (ii) 25-80 parts polytetrafluoroethylene fine powder dispersion containing approximately 60% solids; and
 (b) braiding said polymeric substrates together to form a packing material.

14. The process of claim 13 in which said plurality of substrates are fibers.

15. A product produced according to the process of claim 13.

16. A product produced according to the process of claim 14.

* * * * *